US012775691B2

(12) United States Patent
Marx

(10) Patent No.: US 12,775,691 B2
(45) Date of Patent: Oct. 27, 2026

(54) DEVICE, METHOD, COMPUTER PROGRAM AND SYSTEM FOR AUTHORIZING A COMPUTER PROGRAM TO CARRY OUT ONE OR MORE INSTRUCTIONS

(71) Applicant: MARX Crypto Tech LP, Buford, GA (US)

(72) Inventor: Philipp Wilhelm Marx, Buford, GA (US)

(73) Assignee: MARX Crypto Tech LP, Buford, GA (US)

( * ) Notice: Subject to any disclaimer, the term of this patent is extended or adjusted under 35 U.S.C. 154(b) by 56 days.

(21) Appl. No.: 18/967,934

(22) Filed: Dec. 4, 2024

(65) Prior Publication Data

US 2025/0190537 A1 Jun. 12, 2025

Related U.S. Application Data

(60) Provisional application No. 63/606,997, filed on Dec. 6, 2023.

(30) Foreign Application Priority Data

Dec. 28, 2023 (EP) .................................... 23220584

(51) Int. Cl.
*G06F 21/44* (2013.01)

(52) U.S. Cl.
CPC .................................... *G06F 21/44* (2013.01)

(58) Field of Classification Search
CPC ........................................................ G06F 21/44
See application file for complete search history.

(56) References Cited

U.S. PATENT DOCUMENTS 10,243,935 B2 * 3/2019 Weber .................... H04L 63/107
10,778,450 B1 * 9/2020 Griffin .................. H04L 9/0844
10,812,476 B2 * 10/2020 Alexander .......... H04L 63/0853
(Continued)

FOREIGN PATENT DOCUMENTS

EP 1930835 A1 6/2008
EP 2857932 B1 11/2019
EP 3511895 B1 8/2023

OTHER PUBLICATIONS

"EMV—Integrated Circuit Card Specifications for Payment Systems"; Book 2—Security and Key Management; Internet citation; Jun. 2008; Version 4.2; XP007913922; retrieved from <http://www.iro.umontreal.ca/~salvail/securite/notes2010/EMVv4.2Book2.pdf>; retrieved on Jul. 14, 2010; pp. 37-49.
(Continued)

*Primary Examiner* — Viral S Lakhia
(74) *Attorney, Agent, or Firm* — Kowert, Hood, Munyon, Rankin & Goetzel, P.C.; Jeffrey C. Hood; Luke Langsjoen

(57) ABSTRACT

Devices, methods, computer programs and systems for authorizing a computer program to carry out one or more instructions. The device includes a housing, a processor configured to receive a challenge, a memory configured to store a cryptographic item, and a device to detect a tapping gesture on the housing. The device for detecting the tapping gesture is arranged inside the housing. The processor is configure to create an authorization signal based on the challenge and the cryptographic item; and transmit the authorization signal via a communication interface in response to detecting the tapping gesture.

20 Claims, 9 Drawing Sheets

(56) References Cited

U.S. PATENT DOCUMENTS

| | | | | |
|---|---|---|---|---|
| 11,251,950 | B2 * | 2/2022 | Feng | G06F 21/72 |
| 11,595,380 | B2 * | 2/2023 | Landrock | G07C 9/22 |
| 11,893,576 | B2 * | 2/2024 | Zarakas | G06Q 20/3278 |
| 11,916,900 | B2 * | 2/2024 | Mars | G06F 3/017 |
| 12,182,238 | B2 * | 12/2024 | Seiler | G06F 3/011 |
| 2015/0336421 | A1 * | 11/2015 | Neubauer | B43K 29/08 434/335 |
| 2017/0154328 | A1 | 6/2017 | Zarakas et al. | |
| 2020/0313881 | A1 * | 10/2020 | Feng | H04L 63/0861 |
| 2025/0047466 | A1 * | 2/2025 | Wong | H04L 9/0631 |
| 2025/0076998 | A1 * | 3/2025 | Aurongzeb | G06F 3/03543 |
| 2025/0190589 | A1 * | 6/2025 | Wang | G06F 21/60 |

OTHER PUBLICATIONS

Extended European Search Report; European Application No. 23220584.9; mailed on Apr. 2, 2024; 9 pgs.

* cited by examiner

DEVICE, METHOD, COMPUTER PROGRAM AND SYSTEM FOR AUTHORIZING A COMPUTER PROGRAM TO CARRY OUT ONE OR MORE INSTRUCTIONS

PRIORITY CLAIM

This application claims priority to U.S. Provisional Application No. 63/606,997, titled "Presence Detection Algorithm", and filed on Dec. 6, 2023; and European Patent Application No. EP 23220584.9, titled "Device, method, computer program and system for authorizing a computer program to carry out one or more instructions", and filed on Dec. 28, 2023, both of which are hereby incorporated by reference in their entirety, as though fully and completely set forth herein.

FIELD OF THE INVENTION

The present invention relates to a device, a method, a computer program, and a system for authorizing a computer program to carry out one or more instructions.

DESCRIPTION OF THE RELATED ART

The prevalence of data breaches and cybersecurity risks has increased the need for more effective authentication methods. Multi-factor authentication addresses the limitations of single-factor systems in that it requires users to provide multiple forms (i.e., factors) of verification. A first factor is typically a password known by a user, whereas a second factor is typically a passphrase or key stored on a hardware device. During authorization, the system that is to be authorized checks whether the password is the correct one and uses the key to perform a so-called challenge-response authentication procedure. Such hardware devices are typically universal serial bus (USB) tokens.

However, using the aforementioned two factors is oftentimes not sufficient to provide adequate security. It cannot be excluded that a password is intercepted by an unauthorized third party and that a key or passphrase stored on the hardware device is read out by said third party. Then, both factors may be used to maliciously authorize a computer system or program to perform a protected task, e.g., initiating a bank transfer or the like. To mitigate this risk, known hardware devices comprise components that allow, for example, to determine that the authorized user is presently using the hardware device. This prevents that a stolen password and key or passphrase are used in a malicious way at times when the user who owns the hardware device (i.e., the actual authorized user) is not at his computer.

To ensure that the authorized user is presently at his computer when the hardware device is used for authorization purpose, known hardware devices comprise a sensor, like a fingerprint sensor, a voice recognition sensor, a facial recognition sensor, or simply a button or a switch to be pressed or actuated.

If, for example, a user wants to authorize a computer program to conduct a specific action, like unlocking a screensaver or conducting an electronic bank transfer, the user connects his hardware device (e.g., in terms of a USB token with a fingerprint sensor arranged on its surface) into his computer. Then, the user enters his password into the computer and the key or passphrase stored on the hardware device are used to conduct a challenge-response authentication. The whole process, however, is only activated after the user has actuated the sensor, button or switch, thus ensuring that the user is presently at his computer.

However, such conventional hardware devices have several drawbacks as they either require fragile parts or movable parts on their housing. Fragile parts comprise fingerprint sensors, retina scanners, optical sensors for face recognition, voice recognition sensors, or other biometric sensors. Movable parts comprise buttons or switches. Both movable parts and fragile parts have the drawback that they may easily be damaged during usage. Buttons can be damaged, for example, if they are pressed too hard or too often. Fingerprint sensors can become inoperable due to dirt and can easily be destroyed due to their sensitive surface. Even minor scratches on the surface of fingerprint sensors can render them inoperable. The same drawback applies to retina scanners and other optical sensors, e.g., used for face recognition. Furthermore, the functionality of biometric sensors can be negatively affected by environmental influences. If the environment is too dark, the detection capability of optical face recognition systems may be negatively affected. Shaking or unstable environments, e.g., during a car or train journey, make it more difficult to use fingerprint sensors, as it can be difficult to place the finger on the sensor in shaky or unstable environments so that the finger cannot be scanned properly. If an environment is exposed to strong vibrations, for example, the functionality of sensitive biometric sensors is typically always negatively affected.

Furthermore, the use of biometric sensors can make the use of hardware devices for authentication more difficult and thus more prone to detection errors, as the sensors must be accessible to a user in a certain way. Fingerprint sensors, for example, cannot be used with gloves, while optical sensors for voice recognition or retinal scanning must be positioned in such a way on the hardware devices that the user can easily bring their face or eye close to the sensor. This is difficult or even impossible if the hardware device is connected to a computer placed under a desk. This is similar for speech recognition sensors, as the user typically must bring their mouth close to the hardware device to enable a reliable voice or speech detection.

In view of these disadvantages, the presently known hardware devices may not always lead to the desired results. There is thus a need to improve the presently known conventional hardware devices.

Against this background, an object of the present invention is to address one or more or all of the above-mentioned disadvantages. Particularly, it is an object to provide a hardware device for authorization having an improved durability and robustness and which is less prone to errors and malfunction due to damaged sensors, switches or buttons arranged on the housing. In addition, an object of the invention is to provide a robust detection algorithm for determining the presence of a user, in particular, a detection algorithm that is robust against environmental influence.

SUMMARY OF THE INVENTION

The above-mentioned objects and other objects, which become apparent from the following description, are at least in part solved by the subject-matter of the independent claims. Further embodiments are subject of the dependent claims.

A 1st embodiment of the invention is directed to a device for authorizing a computer program to carry out one or more instructions, the device comprising: a housing; means for receiving a challenge; means for storing a cryptographic item; means for detecting a tapping gesture on the housing, wherein the means for detecting the tapping gesture is arranged inside the housing; means for creating an authorization signal based on the challenge and the cryptographic item; means for transmitting the authorization signal in response to detecting the tapping gesture.

By detecting the tapping gesture on the housing using a means arranged inside the housing (and not by means of buttons, switches or biometric sensor arranged on the housing), no movable and/or fragile components such as a button, a switch, a fingerprint scanner, a microphone for speech detection or an optical sensor are used to recognize a user's face or retina are needed to detect that a user is presently at his computer to conduct the authorization. Consequently, not requiring movable or fragile components on the housing, but rather detecting the tapping gesture on the housing using a means inside the housing used for triggering the authorization process or parts of the authorization process, may improve robustness and durability of the device. Moreover, detecting the tapping gesture on the housing may provide the advantage of detecting tapping gestures that occur on all sides of the housing. Accordingly, a user may not be limited to using the device on one specific side and may properly use the device even if it is installed at a position which does not permit or impedes the use of biometric sensors.

According to a 2nd embodiment, the housing is adapted to enclose the means of the device.

Enclosing the means of the device using the housing may mean using the housing to completely surround or seal off the means of the device. Such enclosure may further mean that no open or exposed areas are present. This further adds to the advantage mentioned above in that the means for detecting the tapping gesture may be enclosed by the housing and thus no movable or fragile components in terms of biometric sensors and/or button and switches may be arranged on the housing of the device. As a consequence, the device may be more durable and less prone to mechanical defects.

According to a 3rd embodiment, the housing is a solid protection housing, preferably made of a rigid material, wherein, more preferably, the housing comprises metal, and wherein, most preferably, the housing is fully made of metal.

A solid protection housing may correspond to a cover or shield that protects from damage and/or destruction. In addition, rigid material may refer to a type of material that is stiff, inflexible and/or resistant. This may provide the advantage that the housing is incapable of easily bending and changing its shape. Further, metal may refer to any commonly known metal such as steel or aluminum. The partial or full use of metal may further provide the advantage of resistance to corrosion, durability, and malleability. However, the housing may also be made of rigid and robust plastic or polymer, thereby achieving the same benefits as outlined with respect to metal.

According to a 4th embodiment, the device does not comprise movable or fragile parts arranged on the housing.

Movable and/or fragile components may decrease overall durability of a device since they may, for instance, easily be damaged or their functionality is otherwise impaired. Consequently, avoiding movable or fragile parts arranged at the housing, like buttons, switches or biometric sensors further adds to the above-described advantage of providing a durable device that is not subject to possible failures through movable or fragile components that could easily be damaged or rendered inoperable.

According to a 5th embodiment, the means for detecting a tapping gesture is further configured to: obtain a first signal based on the tapping gesture; determine that the first signal exceeds a threshold for a first time; detect a first tap of the tapping gesture if the first signal does not exceed the threshold for another time within a first predetermined time period.

Detecting a first tap of the tapping gesture if the first signal does not exceed the threshold for another time within a first predetermined period may provide the advantage of precisely detecting a single tap. In more detail, a detection of unintended signals, e.g., occurred by noise or vibration produced by the environment or surrounding of the device may be filtered out. Overall, the described steps further add to the above-mentioned advantage of providing a robust detection algorithm, which may reduce the probability of false detections in the form of accidental contact with the housing. This may further allow to detach the device from a computer without accidentally activating authorization.

According to a 6th embodiment, the means for detecting a tapping gesture is further configured to: start a first threshold time interval when the first signal exceeds the threshold for the first time; and/or start the first predetermined time period at the end of the first threshold time interval.

The first threshold time interval and the first predetermined time period provide the advantage of setting distinct periods of times in which specific actions may or may not occur. This allows to filter out unwanted taps accidently applied to the device, which may increase security as undesired taps may not lead to an unintended authorization. Overall, this adds to the above-mentioned advantage of providing a robust detection algorithm.

According to a 7th embodiment, the means for detecting a tapping gesture is further configured to: obtain a second signal based on the tapping gesture; determine that the second signal exceeds the threshold after the end of the first predetermined time period and before the end of a timeout time interval; detect a second tap of the tapping gesture if the second signal does not exceed the threshold for another time within a second predetermined time period.

Similar to the 5th embodiment, the 7th embodiment describes the detection of a tap. While the 5th embodiment describes the detection of a first tap, the 7th embodiment describes the detection of a second tap. Overall, the same advantages as mentioned with regards to embodiment 5 apply to embodiment 7. However, it is to note that a second tap may only be detected before the end of a timeout time interval. This may have the advantage of limiting the detection of accidentally performed second taps.

According to an 8th embodiment, the means for detecting a tapping gesture is further configured to: start a second threshold time interval when the second signal exceeds the threshold for the first time; and/or start the second predetermined time period at the end of the second threshold time interval.

Similarly, to the 6th embodiment, the 8th embodiment describes a time interval and a time period. While the 6th embodiment describes the starting points of a first threshold time interval and the first predetermined time period that may be related to the detection of a first tap, the 8th embodiment describes the starting points of a second threshold time interval and the second predetermined time period that may be related to the detection of a second tap. This provides a predefined detection pattern that needs to be detected in order to execute authorization and thus may further minimize the risk of undesired authorizations.

According to a 9th embodiment, the second predetermined time period starts at the end of the second threshold time interval; and/or the timeout time interval starts at the beginning of the first threshold time interval; and/or the first threshold time interval and the second threshold time interval have the same duration; and/or the first predetermined time period and the second predetermined time period have the same duration.

The first threshold time interval and the second threshold time interval having the same duration may provide the advantage of detecting taps that are similar. Likewise, the first predetermined time period and the second predetermined time period having the same duration may provide the advantage of detecting taps that are similar. For instance, two taps that are similar should result in similar corresponding signals. If the duration of the time intervals and/or time periods were not identical, this may result in the first tap being detected, while the second tap is not being detected as such. Overall, the features of the 9th embodiment may further add to the above-mentioned advantage of providing a robust detection algorithm.

According to a 10th embodiment, the means for detecting a tapping gesture is one of: an accelerometer, a 3D microelectromechanical system (3D MEMS).

Microelectromechanical systems provide the advantage of being small in size, volume and weight. In addition, a 3D microelectromechanical system may operate in three dimensions. This may provide the advantage of detecting tapping gestures that occur on all sides of the housing. Furthermore, as the 3D MEMS is arranged inside the housing, it is protected against damage and contamination.

According to an 11th embodiment, the device further comprising a means for adjusting the threshold configured to: track information about the first signal exceeding the threshold; raise the threshold based on the tracked information; wherein the tracked information comprises the number of times per second that the first signal exceeds the threshold for longer than the duration of the first threshold time interval; wherein the threshold is raised when the number of times per second that the first signal exceeds the threshold for longer than the duration of the first threshold time interval is greater or equal to 1; and/or track information about the second signal exceeding the threshold; raise the threshold based on the tracked information; wherein the tracked information comprises the number of times per second that the second signal exceeds the threshold for longer than the duration of the second threshold time interval; wherein the threshold is raised when the number of times per second that the second signal exceeds the threshold for longer than the duration of the second threshold time interval is greater or equal to 1.

The described threshold adjustment may provide the advantage of adjusting the threshold value when required. For instance, when the device is present in an environment with naturally occurring vibrations (e.g., seismic zones, industrial settings, road transportation) it may be necessary to adjust the threshold to account for the additional vibrations and accurately detect a tapping gesture. This may improve detection reliability with respect to the tapping gesture in environments with naturally occurring vibrations, like in trains, cars or in industrial settings.

According to a further embodiment, the device alternatively comprises a means for detecting the tapping gesture based on a neural network, wherein the neural network is trained using a plurality of sample signals recorded from a MEMS; wherein the plurality of sample signals comprises one or more tapping gesture instances and one or more non-tapping gesture instances.

According to a further embodiment, the device comprises a means for applying a digital filter to an output of the 3D MEMS configured to increase a signal to noise ratio of the output; wherein the digital filter is preferably a bandpass filter; wherein the bandpass filter selects a frequency that corresponds to the self-oscillation frequency of the device under a tapping gesture.

According to a 12th embodiment, the means for detecting the tapping gesture is further configured to execute detecting the tapping gesture in response to receiving the challenge.

Executing the tapping gesture detection only in response to receiving the challenge may have the advantage of saving power. This is because the detection is not executed when not required. Moreover, only executing the tapping gesture detection in response to receiving the challenge may further increase security. This is because the risk of a false detection is at least mitigated.

A 13th embodiment of the invention is directed to a method for authorizing a computer program to carry out one or more instructions using a device according to embodiments 1 to 12, the method comprising: receiving a challenge; storing a cryptographic item; detecting a tapping gesture on a housing; creating an authorization signal based on the challenge and the cryptographic item; transmitting the authorization signal in response to detecting the tapping gesture.

A 14th embodiment of the invention is directed to a computer program comprising instructions to perform the method of the 13th embodiment.

A 15th embodiment of the invention is directed to a system for authorizing a computer program to carry out one or more instructions, the system comprising a device according to any one of the claims 1 to 12, or a computer program configured to transmit a challenge to the device and receive an authorization signal from the device.

LIST OF REFERENCE NUMERALS AND ACRONYMS

10—device
20—housing
40—first signal
50—second signal
60—threshold
61, 62—first time
70—U2F protocol module
71—USB HID driver
72—APDU protocol module
73—cryptographic functions module
74—RNG module
75—flash memory
76—user presence check module
77—MC6470 accelerometer module+I2C interface
78—internal timer
79—bootloader reset module
$T_{r1}$—first predetermined time period
$T_{r2}$—second predetermined time period
$T_{s1}$—first threshold time interval
$T_{s2}$—second threshold time interval

BRIEF DESCRIPTION OF THE DRAWINGS

Various aspects of the present invention are described in more detail in the following by reference to the accompanying figures without the present invention being limited to the embodiments of these figures.

Figure 1A:
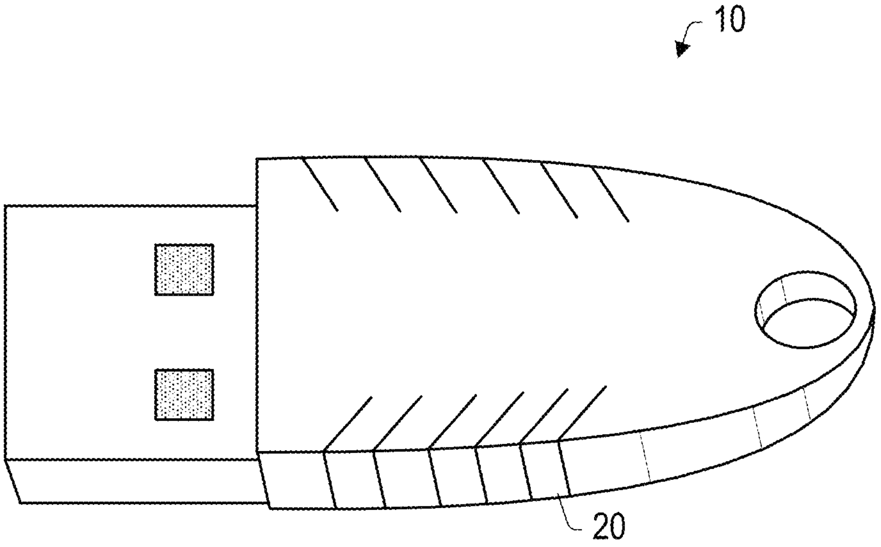
FIG. 1A illustrates a device for authorizing a computer program to carry out one or more instructions according to an embodiment of '1ihe present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

In the following, some exemplary embodiments of the present invention are described in more detail, with reference to the accompanying figures. However, the present invention can also be used in other embodiments not explicitly disclosed hereafter. As detailed below, the embodiments are compatible with each other, and individual features of one embodiment may also be applied to another embodiment.

Throughout the figures and description, the same reference numerals refer to the same elements, unless stated otherwise. The figures may not be drawn to scale, and the relative size, proportions, and depiction of elements in the figures may be exaggerated for the purpose of clarity, illustration, and convenience. The figures do not limit the scope of the claims but merely support the understanding of the invention.

FIG. 1A shows a device 10 for authorizing a computer program to carry out one or more instructions. The device 10 comprises a housing 20. The device further comprises means for receiving a challenge, means for storing a cryptographic item, means for detecting a tapping gesture on the housing, wherein the means for detecting the tapping gesture is arranged inside the housing, and means for creating an authorization signal based on the challenge and the cryptographic item. In addition, the device comprises means for transmitting the authorization signal in response to detecting a tapping gesture. FIG. 1A shows a USB-connector as an exemplary means for transmitting the authorization signal. It is to note that the invention is not limited to the use of a USB-based device.

The challenge may refer to a challenge as used in a challenge-response authentication. Moreover, the cryptographic item may refer to a cryptographic item as used in a challenge-response authentication.

A challenge-response authentication describes specific types of cryptographic protocols that are designed to authenticate a user in a manner that prioritizes security. More specifically, in challenge-response authentication a user initiates an authentication process at a server, e.g., by entering a password. The server then transmits a challenge (e.g., a random value or a nonce) to the user. Next, the user applies a cryptographic item (e.g., a secret, a key) to the challenge to generate a response and transmit it to the server. For instance, a hash function, such as SHA-256, is used to generate the response based on the challenge and the cryptographic item. Subsequently, the server performs further calculations to confirm that the received response must have been generated by the user that owns the specific cryptographic item. In summary, the challenge-response authentication provides a protocol for transmitting information in a manner that prioritizes security.

Exemplary use cases for the device 10 for authorizing a computer program to carry out one or more instructions as shown in FIG. 1A may include but are not limited to online banking (e.g., access online banking account, confirm transaction that is to be executed), remote work (e.g., access to virtual private network) and/or cloud service (e.g., accessing information stored with a cloud service provider). For instance, a user is at home in front of a computer and wishes to transfer funds from one bank account to another bank account. Before the online banking provider releases the transaction, the user is required to authenticate themself. The server of the banking provider may instruct the user to enter a password and/or to confirm their presence in front of the computer by performing a tapping gesture on the device. The user then plugs the device into the computer, receives a challenge from the server and performs the tapping gesture. This triggers a response of a challenge-response process to the server of the banking provider who releases the transaction. In summary, the device provides an extra layer of security by checking whether a user is present and able to perform a specific gesture. With regards to the online banking example, the device provides a solution for authorizing a computer program to perform a protected task inter alia based on the presence of the user in front of the computer and consequently only releasing a transaction once it has been confirmed that the user is presently in front of the computer.

As shown in FIG. 1A, the housing 20 is adapted to enclose the means of the device. While not directly shown, FIG. 1A should illustrate that the means of the device that were described above are enclosed by the housing 20 and thus concealed from view.

While not directly visible in FIG. 1A, it is to note that the housing 20 is a solid protection housing 20, preferably made of rigid material. More preferably, the housing 20 comprises metal and most preferably the housing 20 is fully made of metal.

FIG. 1A further illustrates that the device does not comprise movable or fragile parts arranged on the housing. It can for instance be seen that there are no sensors or other detection means arranged on the housing. A movable part may refer to any component that is capable of being relocated or shifted from one position to another. A movable component may be described as not being stationary and/or not being fixed in a specific position. In addition, a fragile part may refer to any component that can easily be broken and vulnerable to damage, like biometric sensors. Movable and fragile components may lack robustness and durability.

Figure 1B:
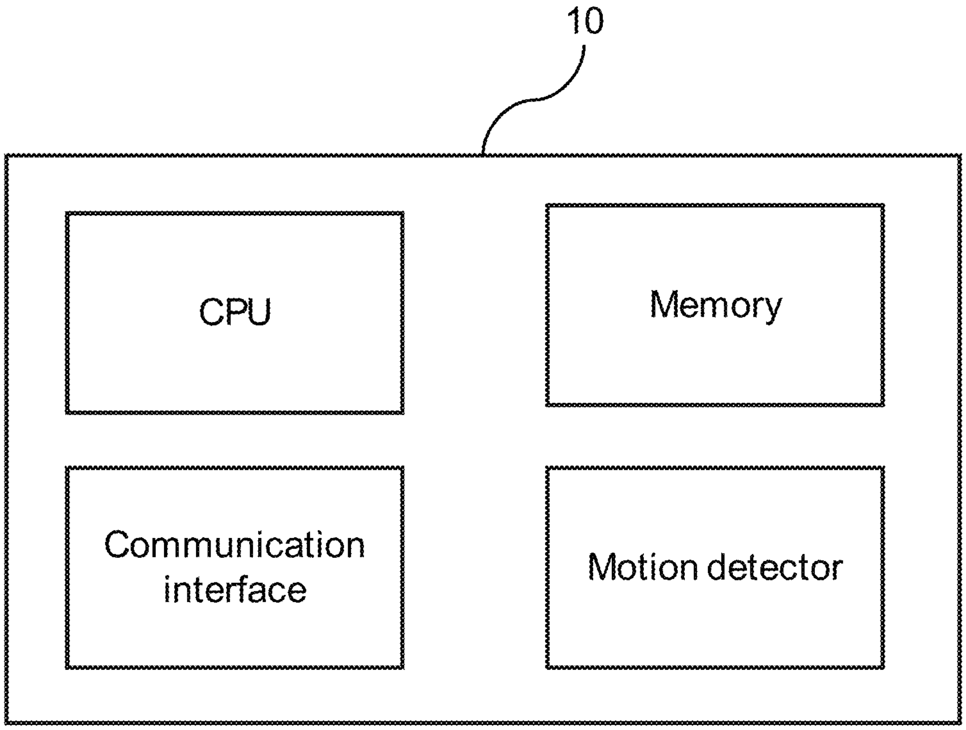
FIG. 1B is a schematic illustration of internal components of a device for authorizing a computer program to carry out one or more instructions according to an embodiment of the present invention.

FIG. 1B illustrates the internal components of the device 10. As illustrated, the device may include a central processing unit (CPU), a non-transitory memory, a communication interface, and/or a motion detector that may each be contained within the housing.

FIG. 1B illustrates that the device 10 may include a motion detector for detecting a tapping gesture. The motion detector may be an accelerometer or a 3D microelectromechanical system (3D MEMS). With regards to FIG. 1A, the motion detector is enclosed in the housing 20 and is thus not visible.

The device shown FIG. 1B may comprise a non-transitory computer-readable memory medium configured to store a cryptographic item. The device may further comprise a means for receiving a challenged, e.g., a processor and/or a communication interface connectable to a computing device. The device may further comprise a processor configured to create an authorization signal based on the challenge. The device may further comprise a means for communicating an authorization signal, e.g., in terms of a processor and/or a communication interface connectable to a computing device.

Figure 2:
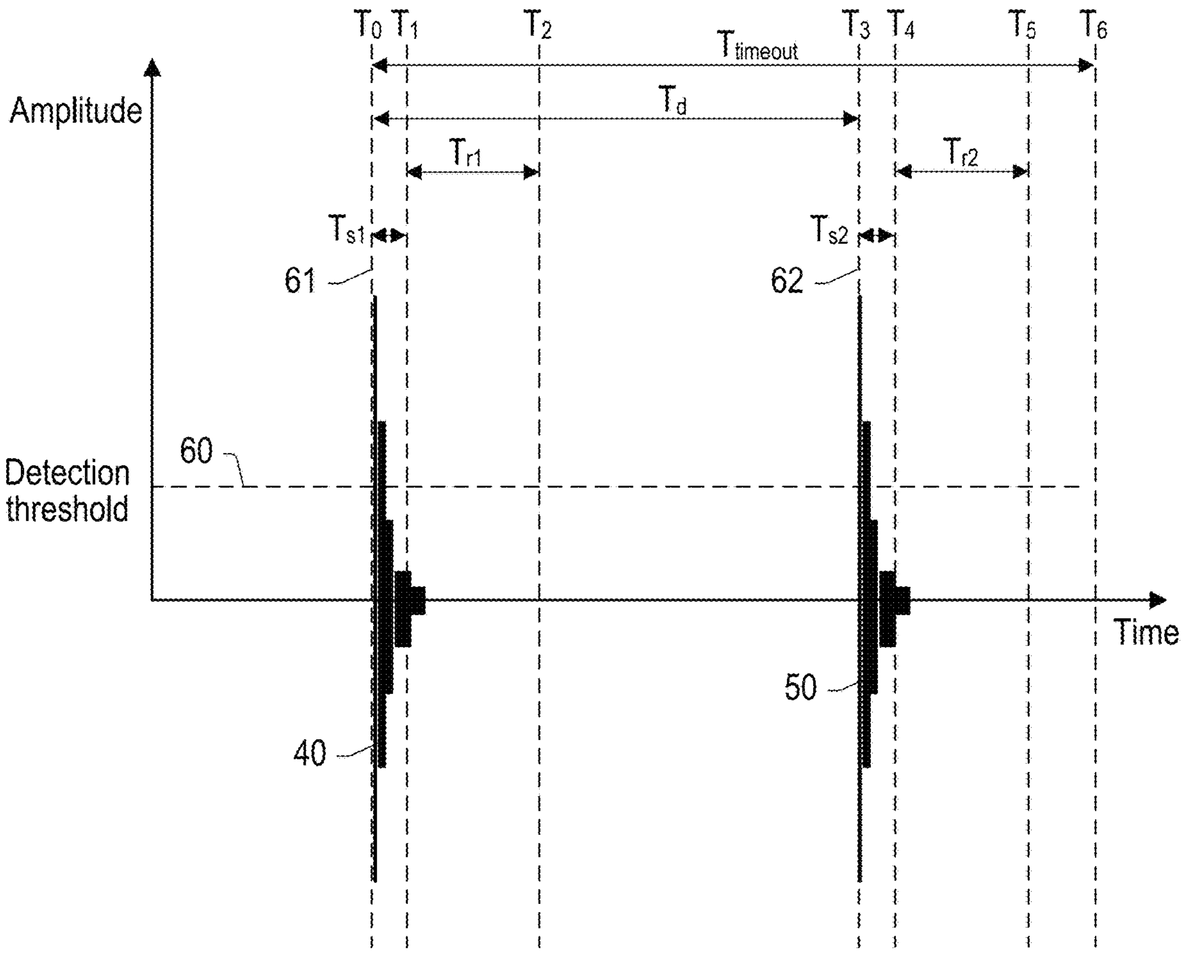
FIG. 2 illustrates a first and a second signal, the threshold and the corresponding time periods and time intervals according to an embodiment of the present invention.

FIG. 2 illustrates an exemplary process for detection of a tapping gesture. More specifically, FIG. 2 shows a diagram that visualizes the amplitude of the first signal 40 and the amplitude of the second signal 50, as shown on the y-axis, over time, as shown on the x-axis. In addition, the detection threshold 60 is marked as a dotted line. Moreover, several time intervals Ts1, Ts2, Tr1, Tr2 and points in time T0 to T6 that are discussed in more detail below are displayed.

The purpose of the process for detecting a tapping gesture includes but is not limited to detection of specific tapping gestures, robust tapping gesture detection, avoidance of false positive tapping gesture detections. For instance, robustness of the detection is enhanced through adaptation of the detection threshold in a vibration-rich environment, as described in more detail below. Moreover, ensuring that the signal is following a specific pattern before detecting a tapping gesture further enhances robustness. This feature also avoids the detection of false positives, in other words, detecting a tapping gesture where no intended tapping gesture has actually taken place. The use of a timeout time interval which is part of detecting the specific tapping gesture, ensures that no taps are detected after a specific time interval has lapsed. Finally, setting identical time intervals for detection of a first and a second tap further increase robustness of the detection and avoid false detection of tapping gestures.

In particular, FIG. 2 shows an exemplary process for detecting a tapping gesture is further configured to obtain a first signal 40 based on a tapping gesture and to determine that the first signal 40 exceeds a threshold 60 at a first time 61. Further, the means for detecting a tapping gesture is configured to detect a first tap of the tapping gesture if the first signal 40 does not exceed threshold 60 at another time within a first predetermined time period Tr1.

Moreover, FIG. 2 shows an exemplary process for detecting a tapping gesture to start a first threshold time interval Ts1 when the first signal 40 exceeds the threshold 60 for the first time 61. In addition, the first predetermined time period Tr1 begins at the end of the first threshold time interval Ts1.

It can also be seen from FIG. 2, which demonstrates an exemplary process for detecting a tapping gesture, that the means for detecting a tapping gesture is further configured to obtain a second signal 50 based on the tapping gesture and determine that the second signal 50 exceeds the threshold 60 after the end of the first predetermined time period Tr1 and before the end of a timeout time interval Ttimeout. Finally, the detection means is configured to detect a second tap of the tapping gesture if the second signal 50 does not exceed the threshold 60 at another time within a second predetermined time period Tr2. Similar to the first signal 40 shown in FIG. 2, which demonstrates an exemplary process for detecting a tapping gesture, shows that also for the second signal 50 the means for detecting a tapping gesture is further configured to start a second threshold time interval Ts2 when the second signal 50 exceeds the threshold for the first time 62 and start the second predetermined time period Tr2 at the end of the second threshold time interval Ts2.

With regards to the beginnings and endings of the various time intervals, FIG. 2, which demonstrates an exemplary process for detecting a tapping gesture, shows that the second predetermined time period Tr2 starts at the end of the second threshold time interval Ts2 and that the timeout time interval Ttimeout starts at the beginning of the first threshold time interval Ts1.

It can also be seen in FIG. 2, which demonstrates an exemplary process for detecting a tapping gesture, that the first threshold time interval Ts1 and the second threshold time interval Ts2 have the same duration. Similarly, the first predetermined time period Tr1 and the second predetermined time period Tr2 also have the same duration. The duration may be fixed. Moreover, the duration may differ between devices and may depend on device configuration.

Figure 3:
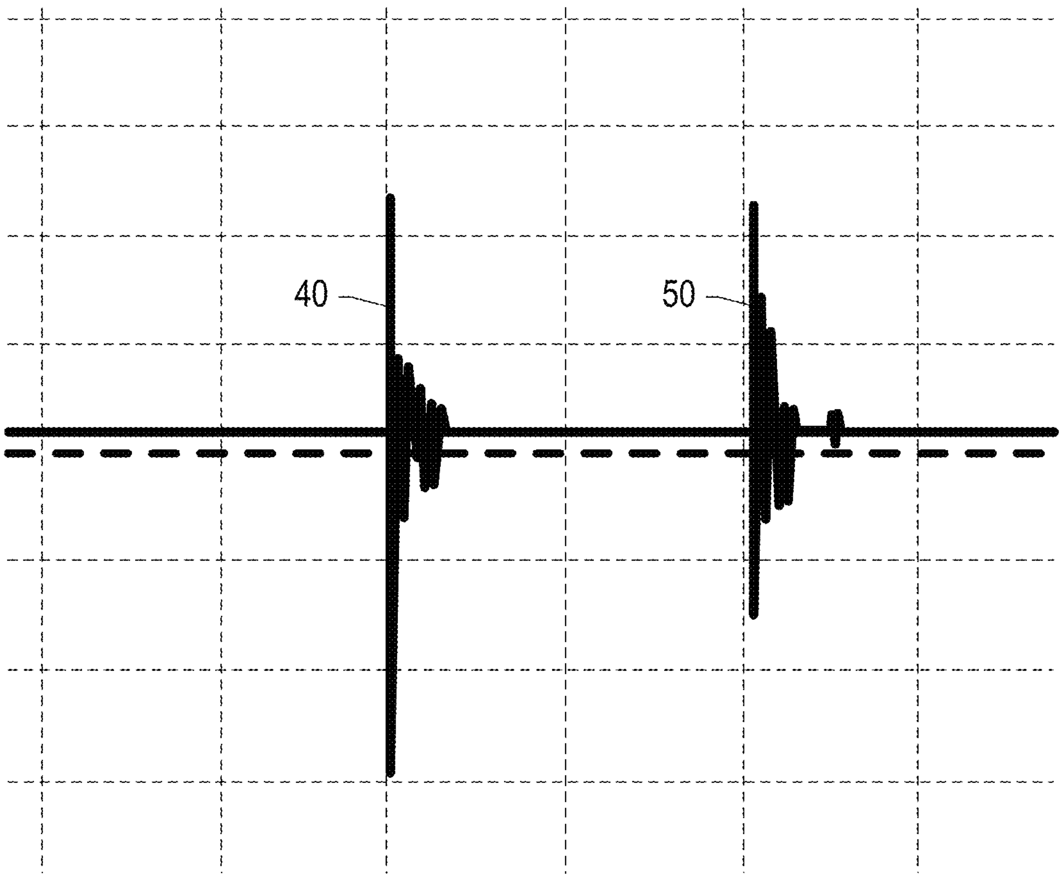
FIG. 3 illustrates an exemplary signal according to an embodiment of the present invention.

While FIG. 2, illustrates the detection of a first signal 40 and a second signal 50 in a simplified manner with a focus on showing the respective time intervals, FIG. 3 shows a recorded first and second signal 40, 50. The first spike represents the first signal 40 and the second spike represents the second signal 50. The same logic with regards to time intervals and the threshold as discussed above also applies to FIG. 3.

The threshold that is seen in FIG. 2 can be adjusted by the means for adjusting the threshold that is configured to track information about the first signal 40 exceeding the threshold 60 and raise the threshold 60 based on the tracked information. Moreover, the tracked information comprises the number of times per second that the first signal 40 exceeds the threshold 60 for longer than the duration of the first threshold time interval Ts1. Finally, the threshold 60 is raised when the number of times per second that the first signal 40 exceeds the threshold 60 for longer than the duration of the first threshold time interval Ts1 is greater or equal to 1.

This logic similarly applies to the second signal in that the threshold that is seen in FIG. 2, which demonstrates an exemplary process for detecting a tapping gesture, can be adjusted by the adjusting means that is configured to track information about the second signal 50 exceeding the threshold 60 and raise the threshold 60 based on the tracked information. Moreover, the tracked information comprises the number of times per second that the second signal 50 exceeds the threshold 60 for longer than the duration of the second threshold time interval Ts2. Finally, the threshold 60 is raised when the number of times per second that the second signal 50 exceeds the threshold 60 for longer than the duration of the second threshold time interval Ts2 is greater or equal to 1.

In an additional embodiment, the device alternatively incorporates a mechanism for detecting tapping gestures utilizing a neural network of an artificial intelligence (AI) engine. The neural network is trained according to known training methods through the analysis of a plurality of sample signals acquired from a Micro-Electro-Mechanical System (MEMS). The sample signals are labeled, wherein the labels indicate the type of signal. The aforementioned plurality of sample signals encompasses instances of one or more tapping gestures and instances of one or more non-tapping gestures, which may include but are not limited to vibrations originating from a cooling fan of a computer, vibrations from a laptop computer situated within a moving vehicle such as a car or a train, and/or analogous conditions. Using am AI engine improve the detection of the tapping gestures such that, for example, the number of false detections is reduced.

In an additional embodiment, the device includes a mechanism for implementing a digital filter on the output of the three-dimensional Micro-Electro-Mechanical System (3D MEMS) to enhance the signal-to-noise ratio of the output. The digital filter, preferably configured as a bandpass filter, is designed to selectively pass frequencies aligning with the self-oscillation frequency of the device during a tapping gesture. This may further improve the accuracy of detecting a tapping gesture.

Figure 4:
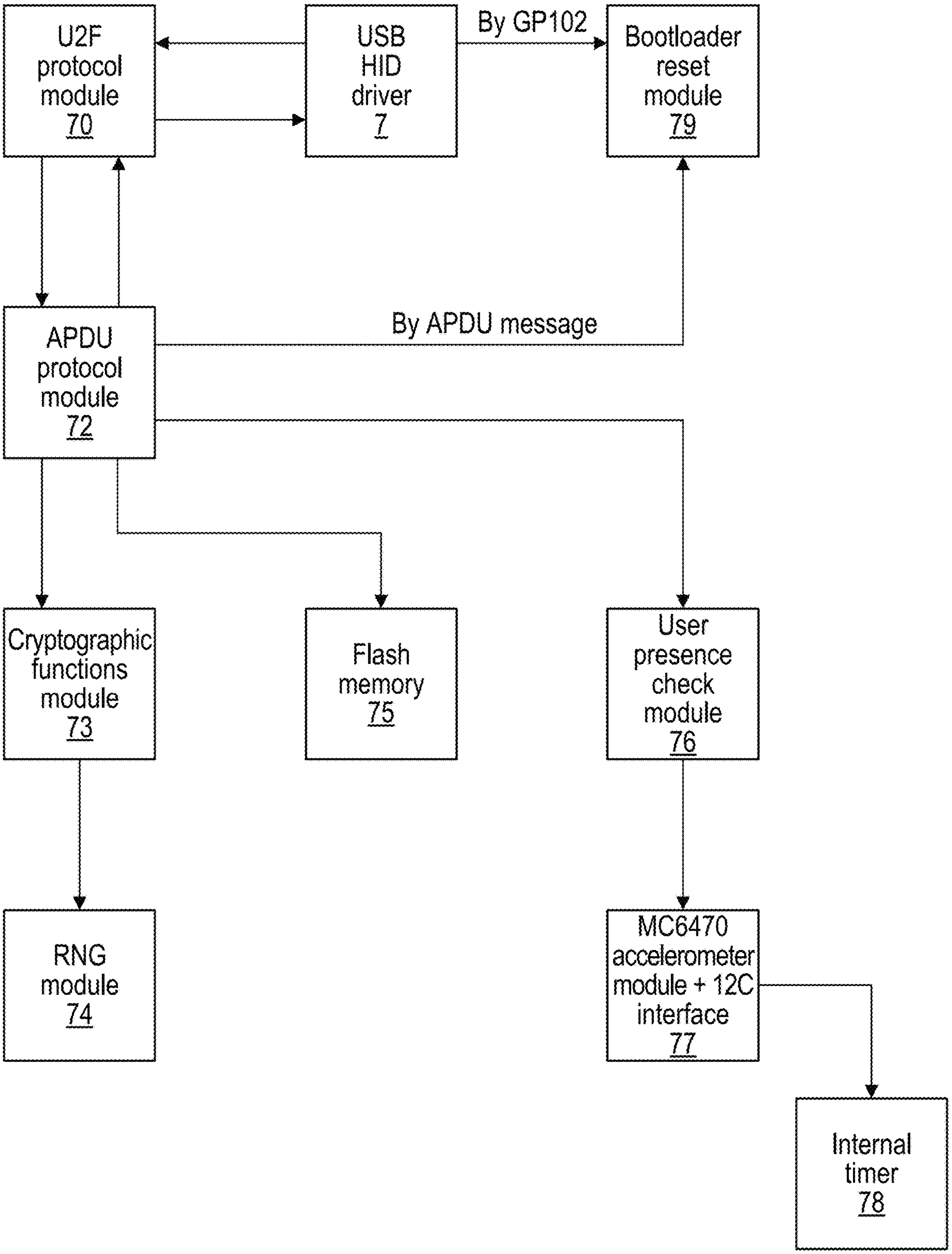
FIG. 4 illustrates a firmware block diagram according to an embodiment of the present invention.

FIG. 4 shows a firmware block diagram of an exemplary implementation of the device. More specifically, different modules 70, 71, 72, 73, 74, 75, 76, 77, 78, 79 that are executed on the device 10 and that collectively enable the tapping gesture detection and authorizing of a computer program to carry out one or more instructions are described. It is to emphasize that the present invention is by no means limited to the exemplary implementation. The different components of the diagram are explained in more detail in the following passages.

The USB human interface device (HID) driver 71 seen in FIG. 4 serves as communication layer between the device and a personal computer (PC). It forwards messages from the PC to the universal second factor (U2F) protocol module 70 described below and replies back to the PC. With regards to the implementation, secure microcontroller driver functions are used to set up USB HID and receive/transmit messages. The USB HID driver algorithm comprises the following steps: first describe HID descriptors, second describe USB HID protocol callbacks, third initialize USB protocol structures, fourth call the USB HID initialization function, fifth receive messages in endless loop and finally receive callback signals when the message is ready to be processed by the U2F protocol module. The USB protocol uses two endpoints in interrupt mode, namely USB_ENDPOINT1 as IN endpoint (to send data to the host) and USB_ENDPOINT2 as OUT endpoint (to get data from the host). The HID descriptors also define such information about the device as manufacturer's name, product's name, serial number, product identification (ID) and vendor ID.

The U2F protocol module 70 as shown in FIG. 4 processes messages from USB HID module and either sends back a reply, or, in case an application protocol data unit (APDU) request is detected, transmits it to the APDU protocol module 72. The U2F protocol is briefly described in this paragraph. The U2F protocol has two types of messages: "initialization" and "continuation" packets. The seventh bit of byte with index four determine the type of the packet. The U2F initialization packet structure is shown in the Table 1 below and the U2F continuation packet structure is shown in the Table 2 below.

TABLE 1

| Offset | Length | Mnemonic | Description |
|---|---|---|---|
| 0 | 4 | CID | Channel identifier |
| 4 | 1 | CMD | Command identifier (bit 7 always set) |
| 5 | 1 | BCNTH | High part of payload length |
| 6 | 1 | BCNTL | Low part of payload length |
| 7 | (s − 7) | DATA | Payload data (s is equal to the fixed packet size) |

TABLE 2

| Offset | Length | Mnemonic | Description |
|---|---|---|---|
| 0 | 4 | CID | Channel identifier |
| 4 | 1 | SEQ | Packet sequence 0x00 . . . 0x71 (bit 7 always cleared) |
| 5 | (s − 5) | DATA | Payload data (s is equal to the fixed packet size) |

The U2F protocol also defines several message commands (CMD field). The firmware contains following implementation communication with next commands: U2FHID_MSG, U2FHID_INIT, U2FHID_PING, U2FHID_ERROR.

With regards to the implementation, the algorithm of the U2F_HID module is the following: Step one applies if the received message is a U2FHID_INIT. The firmware needs to allocate a unique 32-bit channel identifier (CID) that can be used by the requesting application during communication. The response message also contains the nonce from the request message and information about the used U2F protocol version and flags. After sending a response by USB this module returns control to the USB HID driver 71. Step two applies if the received message is not a U2FHID_INIT command. Then the module checks the type of the packet. If the packet is an initialization packet, U2F HID module saves CID value, CMD value, length of the full message and payload data to the buffer, calculating the remaining bytes to be received in the next continuation packet. If the packet is a continuation packet, U2F HID module appends payload data to the buffer, calculating the remaining bytes to be received in the next continuation packet. In step three, the module checks the remaining byte value. If there are no more remaining bytes to be received, the command type is checked. If the command type is U2FHID_PING, a response to a ping request by the USB is received. If the command type is U2FHID_MSG, buffer data is sent to APDU protocol module 72 for processing. After that a response from APDU protocol module 72 is sent by the USB. Otherwise, an error response is sent by the USB. Finally, control is returned to the USB HID driver 71.

The APDU protocol module 72 as illustrated in FIG. 4 processes APDU requests, generates and compares keys. The APDU request message contains following fields: A CLA field. The CLA field is reserved to be used by the underlying transport protocol (if applicable). The host application shall set this byte to zero. An INS field which is a U2F command code. A P1 field which stands for parameter one and is defined by each command. A P2 field which stands for parameter two and is defined by each command. LC1 to LC3 fields which shows the length of the requested data encoded in big-endian. The APDU protocol defines several U2F messages codes, such as U2F_REGISTER, U2F_AUTHENTICATE. and U2F_VERSION. Moreover, the APDU protocol allows to define vendor-specific commands.

With respect to implementation, the logic of the APDU protocol module 72 is processing requests and sending responses to the U2F protocol module. A description of processing different messages is provided below. The message U2F_REGISTER is processed as follows. First, it is checked if the certificate is present in flash memory 75. If the certificate is not present, an error is sent. Second, the user presence is checked. If the user is not present, an error is sent. Third, a register response is generated. Fourth, U2F_SW_NO_ERROR is appended to the response if everything is okay, otherwise an error is sent. The message U2F_AUTHENTICATE is processed as follows. First, it is checked if the certificate is present in flash memory 75. If the certificate is not present, an error is sent. Second, the keys are checked. If the keys are not the same, an error is sent. Third, user presence is checked. If the user is not present, an error is sent. The counter for authentication operations is incremented. U2F_SW_NO_ERROR is appended to the response. The message U2F_VERSION is processed as follow. A version string is copied to the response. U2F_SW_NO_ERROR is appended to the response. The message U2F_CERT_INIT (vendor-specific) is processed as follows. It is checked if a certificate has already been initialized. If this is the case, an error is sent. The certificate data is written to flash memory 75. U2F_SW_NO_ERROR is appended to the response if everything is okay, otherwise an error is sent. The message U2F_CERT_EDIT (vendor-specific) is processed as follows. It is checked if a certificate has already been initialized. If this is the case, an error is sent. The certificate data is rewritten to flash memory 75. U2F_SW_NO_ERROR is appended to the response if everything is okay, otherwise an error is sent.

The following paragraphs describe the logic for generating and comparing keys in more detail. The device stores only one private key called "device key". The device key is generated during the first time the device is started after flashing the firmware. The device key consists of 32 random bytes which are "key" and 32 bytes hash, calculated by SHA256 algorithm using "key" as an input data. The module requires a key hash to ensure that the device key is present in flash memory 75 during every device start. The device does not store every registered private and public key. Instead of this, the firmware uses hash-based message authentication code (HMAC) and elliptic curve cryptography (ECC) algorithms. They allow to restore a private key using public information from an authenticate request as a key handle with a nonce and a secret device key. And then the module generates a key handle from the restored private key and compares it to the key handle in the authenticate request. The HMAC algorithm uses such blocks as ipad and opad. They are just a sequence of values 0x36 and 0x5C accordingly. The symbol || which is used later in the HMAC formulas means concatenation.

Figure 5:
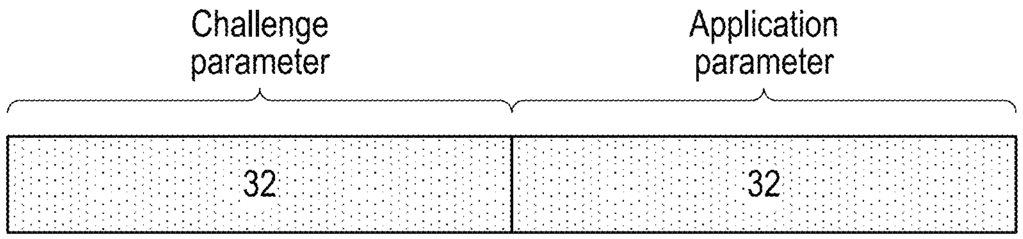
FIG. 5 illustrates a registration request message according to an embodiment of the present invention.

FIG. 5 shows the structure of the request message (U2F_REGISTER) that may be received by the device.

Figure 6:
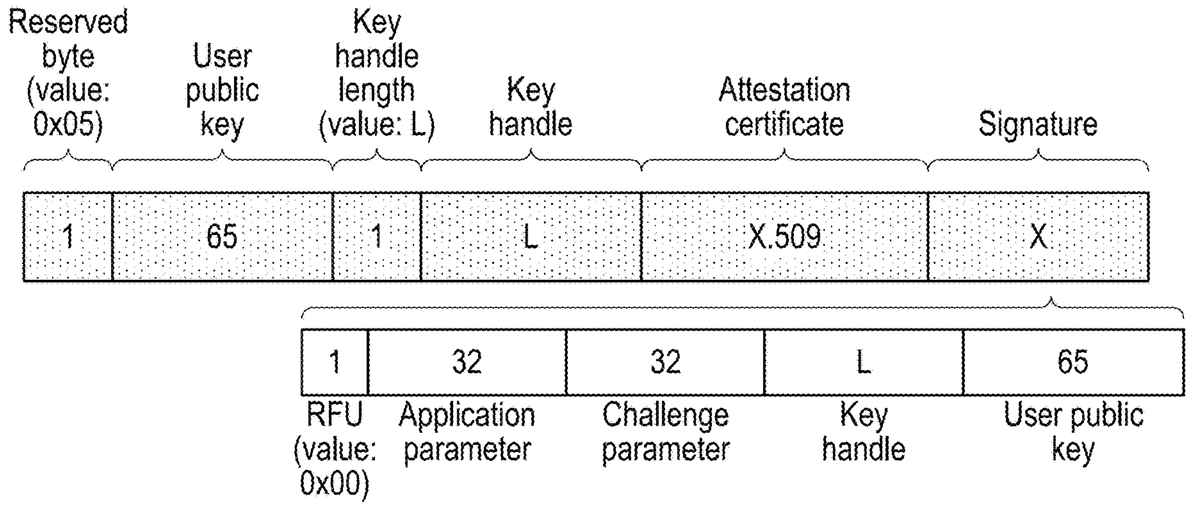
FIG. 6 illustrates a registration response message according to an embodiment of the present invention.

The algorithm for generating keys is as follows. First, a new private key is generated using HMAC SHA256 (privatekey=H ((K_0 xoropad) @ (H (K_0 xoripad) @ appid @ nonce))). Second, a key handle is created using HMAC SHA256 (privatekey=H ((K_0 xoropad) @ (H (K_0 xoripad) @appid@nonce))). Third, a nonce value is appended to the key handle. Fourth, public key is generated using the ECC algorithm and P-256 NIST elliptic curve. It is done by cryptographic driver function. Fifth, an EEC signature is generated using attestation certificate private key over SHA256 hash of following byte string, as shown in FIG. 6: reserved byte for future use (0x00), application parameter, challenge parameter, key handle, user public key. Sixth, the signature length is computed. Seventh, the response structure is filled by data. The requesting application stores only public key and key handle.

Figure 7:
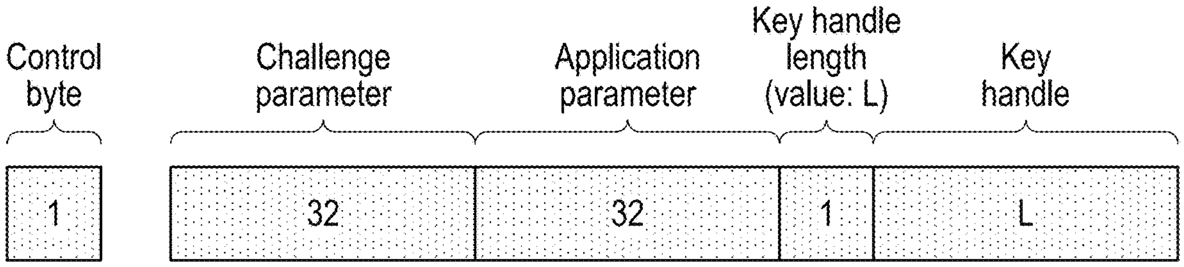
FIG. 7 illustrates an authentication request message according to an embodiment of the present invention.

FIG. 7 shows the structure of the request message (U2F_AUTHENTICATE) that is received by the device.

Figure 8:
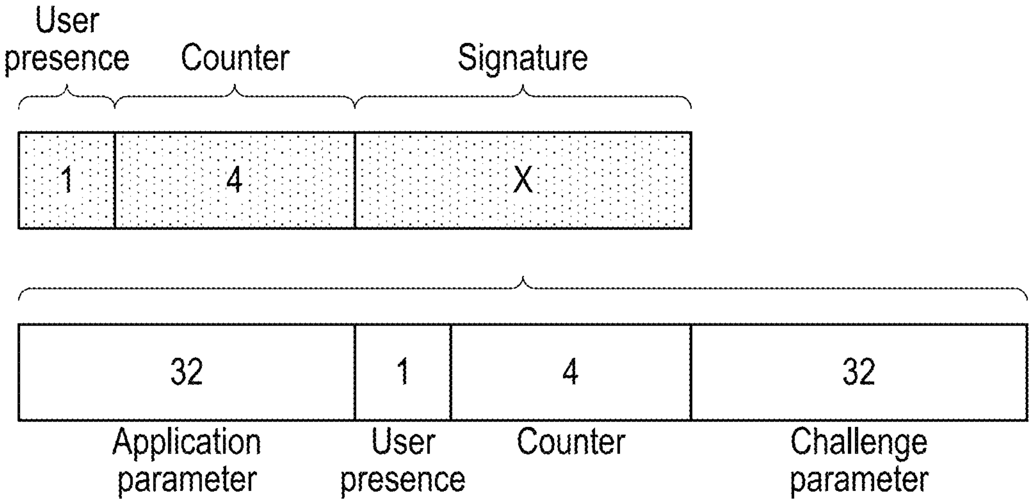
FIG. 8 illustrates an authentication response message according to an embodiment of the present invention.

The algorithm for checking a registered key is as follows. First, a private key is recovered using application ID and nonce (from key handle) by HMAC SHA256 (restoredprivatekey=H ((K_0 xoropad) @ (H (K_0 xoripad) @ appid @ nonce)). Second a key handle is created from the generated private key using HMAC SHA256 (newkeyhandle=H ((K_0 xoropad) @ (H (K_0 xoripad) @ restoredprivatekey @ appid)). Third, newkeyhandle is compared to key handle in authenticate request. If they are the same, it means that the authentication process was successful. Fourth, set the user presence flag, that means user presence was verified. Fifth, read "counter". This is the big-endian representation of a counter value that the device increments every time it performs an authentication operation. Sixth, as shown in FIG. 8, generate an ECC signature using the restored private key over SHA256 hash of following byte string: application parameter, user presence, counter, challenge parameter. Seventh, the signature length is computed. Eighth, the response structure is filled by data.

The cryptographic functions module 73, as shown in FIG. 4, implements SHA256 algorithm using cryptographic driver functions. This module is used for more comfortable work with SHA256 block functions. The standard cryptographic implementation of the driver does not allow updating blocks with data of any length. The module has three functions. First, sha256_init_block which sets block size and position to 0. Second, sha256_add_data_to_block which adds data to big block which is used as a buffer and updates block current end and size. Third, sha256_do which performs SHA256 algorithm on all data saved in block, by calling standard cryptographic driver functions.

The random number generator (RNG) module 74, as illustrated in FIG. 4, generates random numbers for cryptographic functions using special MPU registers. Secure Microcontroller has a special Random Word Data Register (RWDR) which contains random two bytes. It updates the value after reading between two central processing unit (CPU) clock cycles.

The flash memory 75, also shown in FIG. 4, is used as persistent storage for private device key, certificate and certificate key and authenticate counter. The private device key is generated and wrote once during first device start after flashing. Certificate data must be written by the user and can be changed by user. The authenticate counter increments every time the device is used to authenticate request. Every component takes one sector in memory i.e., 2048 bytes. When the authenticate counter is incremented, it takes the next four bytes to be stored in the sector. When it reaches last 2048th byte, the sector is erased, and the counter value is placed at the beginning again. This algorithm allows to minimize the amount of flash memory 75 write operations.

The user presence check module 76 that can be seen in FIG. 4 implements the double tap detection described earlier, e.g., with respect to FIG. 2, by getting and processing taps from accelerometer. Controls interrupts from the accelerometer enabling/disabling. This module has two interrupt handlers: First, the GPIOs_Handler. This handler is for interrupts from the accelerometer on general-purpose input/output (GPIO0). This interrupt reads data from accelerometer register (0x03) and, if there was a request for user presence check, processes register data, otherwise it does not do anything. Second, INTTIMER_Handler. This handler increments a global variable every one millisecond. It is used for tracking delays between accelerometer interrupts. The application programming interface (API) of this module is as follows. First, request_user_presence( ). APDU protocol module 72 can request user presence check by calling this function. While this request is active GPIOs_Handler processes accelerometer interrupts. To detect a double tap event, two interrupts must occur with a time delay between 200 and 1000 milliseconds. If such situation was happening, user presence is set. Second, get_user_presence( ). APDU protocol module 72 can know about user present through this function. Third, reset_user_presence( ). When APDU doesn't need user presence check anymore it calls this function. It resets user presence and request.

The MC6470 accelerometer module and the inter integrated circuit (I2C) interface 77, shown in FIG. 4, provides a MC6470 accelerometer module configuration via I2C interface. This module contains functions to receive and send I2C messages using standard I2C driver functions but adds error checks. Also, there is an accelerometer configuration function. It is necessary to set up MC6470 to use the double taps feature as for instance, described in FIG. 2. The list and value of configured registers are: the tap control register (0x09) that enables tap detection on XYZ negative axis and enables tap threshold settings in registers 0x0A, 0x0B, 0x0C. Value is 0xEA. The X tap duration and threshold register (0x0A) where tap threshold value is sat as 0x05. The Y tap duration and threshold register (0x0B) where tap threshold value is sat as 0x05. The Z tap duration and threshold register (0x0C) where tap threshold value is sat as 0x05. The interrupt enable register (0x06) which enables XYZ negative axis interrupts on tap detection. The value is 0x2A. The MODE register (0x07) which enables WAKE state, value is 0x01. Only in this state the accelerometer can generate interrupts, but all registers except this one become read-only.

The internal timer 78 that can be seen in FIG. 4 is a hardware timer used for measuring delays between taps. It is configured to generate interrupt every one millisecond.

The bootloader reset module 79, as shown in FIG. 4, configures the device for a firmware update mode.

A console tool (certtool) is supplied for communicating with the device through the USB HID protocol. It allows to initialize or change attestation certificate with its own key on the device.

Figure 9:
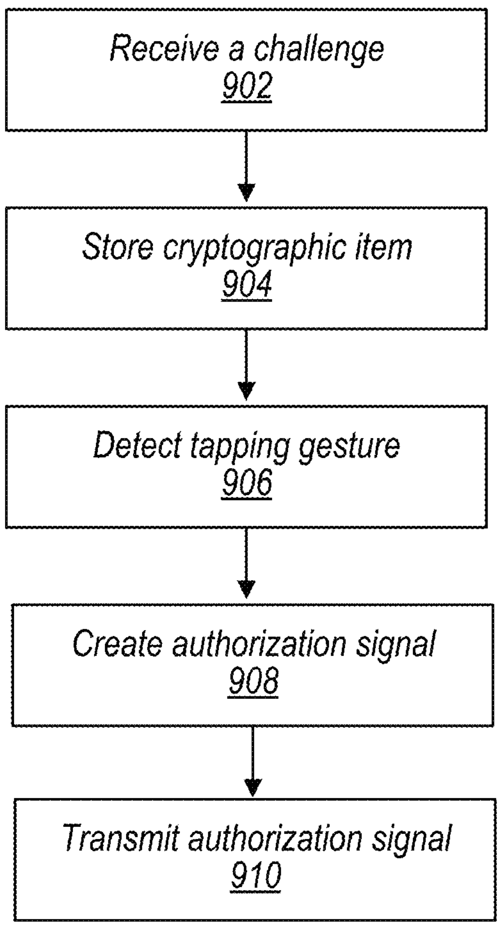
FIG. 9 is a flow chart illustrating a method for authorizing a computer program to carry out instructions, according to some embodiments.

FIG. 9—Flowchart for Authorizing a Computer Program

FIG. 9 is a flow chart illustrating a method for authorizing a computer program to carry out instructions, according to some embodiments. The described methods may be performed by a processor executing program instructions stored on a non-transitory computer-readable memory medium, potentially in conjunction with a machine detector, a communication interface, and/or a housing of an authentication device. The processor and memory may be adapted to be enclosed within the housing of the authentication device, in some embodiments.

In various embodiments, some of the elements of the methods shown may be performed concurrently, in a different order than shown, may be substituted for by other method elements, or may be omitted. Additional method elements may also be performed as desired. As shown, the method may proceed as follows.

At 902, a challenge is received. The challenge may be received via a communication interface of an authentication device. The challenge may be associated with a challenge-response authentication procedure, and may be received from a server responsive to a user initiating an authentication process, in some embodiments.

At 904, a cryptographic item is stored in a non-transitory computer-readable memory medium. The cryptographic item may be a key, such as a private key, that is stored in the memory medium when a user registers the authentication device to perform the authentication procedure. The cryptographic item may be configured to produce an authentication response in conjunction with the challenge.

At 906, a tapping gesture is detected on a housing. The executing detection of the tapping gesture may be performed responsive to receiving the challenge, in some embodiments. The tapping gesture may be detected by a motion detector, such as an accelerometer, a 3-dimensional microelectromechanical system (3D MEMS), or another type of motion detecting device, and provided to the processor. The motion detector may be arranged inside the housing of the authentication device.

In some embodiments, a first signal is obtained based on the tapping gesture. It may be determined that the first signal exceeds a threshold at a first time, and a first tap of the tapping gesture may be detected when the first signal does not exceed the threshold at another time within a first predetermined time period ($T_{r1}$).

In some embodiments, a first threshold time interval ($T_{s1}$) is started when the first signal exceeds the threshold at the first time, and the first predetermined time period ($T_{r1}$) is started at the end of the first threshold time interval ($T_{s1}$).

In some embodiments, information is tracked about the first signal exceeding the threshold. and the threshold is raised based on the tracked information. The tracked information may include a number of times per second that the first signal exceeds the threshold for longer than the duration of the first threshold time interval ($T_{s1}$). The threshold may be raised when the number of times per second that the first signal exceeds the threshold for longer than the duration of the first threshold time interval ($T_{s1}$) is greater or equal to 1.

In some embodiments, a second signal is obtained based on the tapping gesture. It may be determined that the second signal exceeds the threshold after the end of the first predetermined time period ($T_{r1}$) and before the end of a timeout time interval. A second tap of the tapping gesture may be detected when the second signal does not exceed the threshold at another time within a second predetermined time period ($T_{r2}$).

In some embodiments, a second threshold time interval ($T_{s2}$) is started when the second signal exceeds the threshold at the first time, and the second predetermined time period ($T_{r2}$) is started at the end of the second threshold time interval ($T_{s2}$).

In some embodiments, information is tracked about the second signal exceeding the threshold, and the threshold is raised based on the tracked information. The tracked information may include a number of times per second that the second signal exceeds the threshold for longer than the duration of the second threshold time interval ($T_{s2}$). The threshold may be raised when the number of times per second that the second signal exceeds the threshold for longer than the duration of the second threshold time interval ($T_{s2}$) is greater or equal to 1.

In some embodiments, the second predetermined time period ($T_{r2}$) starts at the end of the second threshold time interval ($T_{s2}$), the timeout time interval starts at the beginning of the first threshold time interval ($T_{s1}$), the first threshold time interval ($T_{s1}$) and the second threshold time interval ($T_{s2}$) have a same first duration; and/or the first predetermined time period ($T_{r1}$) and the second predetermined time period ($T_{r2}$) have a same second duration.

At 908, an authorization signal is created based on the challenge and the cryptographic item.

At 910, the authorization signal is transmitted in response to detecting the tapping gesture. The authorization signal may be transmitted via the communication interface, in some embodiments.

Embodiments of the present disclosure may be realized in any of various forms, e.g., in software and/or in hardware. For example, in some embodiments, the present invention may be realized as a computer-implemented method, a computer-readable memory medium, or a computer system.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system or a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. In particular, with reference to the appended claims, features from dependent claims may be combined with those of the independent claims and features from respective independent claims may be combined in any appropriate manner and not merely in the specific combinations enumerated in the appended claims.

While specific feature combinations are described in the following with respect to the exemplary embodiments of the present invention, it is to be understood that the disclosure is not limited to such embodiments. In other words, not all features have to be present for realizing the invention, and the embodiments may be modified by combining certain features of one embodiment with one or more features of another embodiment. Specifically, the skilled person will understand that features, components and/or functional elements of one embodiment can be combined with technically compatible features, components and/or functional elements of any other embodiment of the present invention.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A device for authorizing a computer program to carry out one or more instructions, the device comprising:

a housing;

a processor coupled to a communication interface configured to receive a challenge;

a non-transitory computer-readable memory medium operably coupled to the processor and configured to store a cryptographic item;

a motion detector configured to detect a tapping gesture on the housing, wherein the motion detector is arranged inside the housing;

wherein the processor is configured to:

create an authorization signal based on the challenge and the cryptographic item; and transmit the authorization signal via the communication interface in response to detecting the tapping gesture;

wherein the device is further configured to:

obtain a first signal based on the tapping gesture;

determine that the first signal exceeds a threshold at a first time;

detect a first tap of the tapping gesture when the first signal does not exceed the threshold at another time within a first predetermined time period ($T_{r1}$);

start a first threshold time interval ($T_{s1}$) when the first signal exceeds the threshold at the first time; and start the first predetermined time period ($T_{r1}$) at the end of the first threshold time interval ($T_{s1}$).

2. The device of claim 1, wherein the housing is adapted to enclose the processor and the non-transitory computer-readable memory medium.

3. The device of claim 1, wherein the housing is a solid protection housing composed of a rigid material.

4. The device of claim 1, wherein the device does not comprise movable or fragile parts arranged on the housing.

5. The device of claim 1, wherein the processor is further configured to:

track information about the first signal exceeding the threshold; and raise the threshold based on the tracked information;

wherein the tracked information comprises a number of times per second that the first signal exceeds the threshold for longer than the duration of the first threshold time interval ($T_{s1}$);

wherein the threshold is raised when the number of times per second that the first signal exceeds the threshold for longer than the duration of the first threshold time interval ($T_{s1}$) is greater than or equal to 1.

6. The device of claim 1, wherein the device is further configured to:

obtain a second signal based on the tapping gesture;

determine that the second signal exceeds the threshold after the end of the first predetermined time period ($T_{r1}$) and before the end of a timeout time interval; and detect a second tap of the tapping gesture when the second signal does not exceed the threshold at another time within a second predetermined time period ($T_{r2}$).

7. The device of claim 6, wherein the device is further configured to:

start a second threshold time interval ($T_{s2}$) when the second signal exceeds the threshold at the first time; and start the second predetermined time period ($T_{r2}$) at the end of the second threshold time interval ($T_{s2}$).

8. The device of claim 7, wherein the processor is further configured to:

track information about the second signal exceeding the threshold; and raise the threshold based on the tracked information, wherein the tracked information comprises a number of times per second that the second signal exceeds the threshold for longer than the duration of the second threshold time interval ($T_{s2}$);

wherein the threshold is raised when the number of times per second that the second signal exceeds the threshold for longer than the duration of the second threshold time interval ($T_{s2}$) is greater than or equal to 1.

9. The device of claim 7, wherein the second predetermined time period ($T_{r2}$) starts at the end of the second threshold time interval ($T_{s2}$);

wherein the timeout time interval starts at the beginning of the first threshold time interval ($T_{s1}$);

wherein the first threshold time interval ($T_{s1}$) and the second threshold time interval ($T_{s2}$) have a same first duration; and/or wherein the first predetermined time period ($T_{r1}$) and the second predetermined time period ($T_{r2}$) have a same second duration.

10. The device of claim 1, wherein the motion detector comprises an accelerometer or a 3-dimensional microelectromechanical system (3D MEMS).

11. The device of claim 1, wherein the motion detector is further configured to:

execute detecting the tapping gesture in response to receiving the challenge.

12. A method for authorizing a computer program to carry out one or more instructions, the method comprising:

receiving a challenge;

storing a cryptographic item in a non-transitory computer-readable memory medium;

detecting a tapping gesture on a housing;

obtaining a first signal based on the tapping gesture;

determining that the first signal exceeds a threshold at a first time;

detecting a first tap of the tapping gesture when the first signal does not exceed the threshold at another time within a first predetermined time period ($T_{r1}$);

starting a first threshold time interval ($T_{s1}$) when the first signal exceeds the threshold at the first time;

starting the first predetermined time period ($T_{r1}$) at the end of the first threshold time interval ($T_{s1}$);

creating an authorization signal based on the challenge and the cryptographic item; and transmitting the authorization signal in response to detecting the tapping gesture.

13. The method of claim 12, further comprising:

tracking information about the first signal exceeding the threshold; and raising the threshold based on the tracked information;

wherein the tracked information comprises a number of times per second that the first signal exceeds the threshold for longer than the duration of the first threshold time interval ($T_{s1}$);

wherein the threshold is raised when the number of times per second that the first signal exceeds the threshold for longer than the duration of the first threshold time interval ($T_{s1}$) is greater than or equal to 1.

14. A non-transitory computer-readable memory medium comprising program instructions that, when executed by a processor, cause a device to:

receive a challenge;

store a cryptographic item in the non-transitory compute-readable memory medium;

detect a tapping gesture on a housing of the device via a motion detector;

obtain a first signal based on the tapping gesture;

determine that the first signal exceeds a threshold at a first time;

detect a first tap of the tapping gesture when the first signal does not exceed the threshold at another time within a first predetermined time period ($T_{r1}$);

start a first threshold time interval ($T_{s1}$) when the first signal exceeds the threshold at the first time;

start the first predetermined time period ($T_{r1}$) at the end of the first threshold time interval ($T_{s1}$);

create an authorization signal based on the challenge and the cryptographic item; and transmit the authorization signal via a communication interface in response to detecting the tapping gesture.

15. The non-transitory computer-readable memory medium of claim 14, wherein the non-transitory computer-readable memory medium and the processor are adapted to be enclosed within the housing.

16. The non-transitory computer-readable memory medium of claim 14, wherein the program instructions are further executable to:

cause the motion detector to execute detecting the tapping gesture in response to receiving the challenge.

17. The method of claim 12, further comprising:

obtaining a second signal based on the tapping gesture;

determining that the second signal exceeds the threshold after the end of the first predetermined time period ($T_{r1}$) and before the end of a timeout time interval;

detecting a second tap of the tapping gesture when the second signal does not exceed the threshold at another time within a second predetermined time period ($T_{r2}$);

starting a second threshold time interval ($T_{s2}$) when the second signal exceeds the threshold at the first time; and starting the second predetermined time period ($T_{r2}$) at the end of the second threshold time interval ($T_{s2}$).

18. The method of claim 17, further comprising:

tracking information about the second signal exceeding the threshold; and raising the threshold based on the tracked information, wherein the tracked information comprises a number of times per second that the second signal exceeds the threshold for longer than the duration of the second threshold time interval ($T_{s2}$);

wherein the threshold is raised when the number of times per second that the second signal exceeds the threshold for longer than the duration of the second threshold time interval ($T_{s2}$) is greater than or equal to 1.

19. The method of claim 12, wherein detecting the tapping gesture is performed responsive to receiving the challenge.

20. The non-transitory computer-readable memory medium of claim 14, wherein the program instructions are further executable to cause the device to:

track information about the first signal exceeding the threshold; and raise the threshold based on the tracked information;

wherein the tracked information comprises a number of times per second that the first signal exceeds the threshold for longer than the duration of the first threshold time interval ($T_{s1}$);

wherein the threshold is raised when the number of times per second that the first signal exceeds the threshold for longer than the duration of the first threshold time interval ($T_{s1}$) is greater than or equal to 1.

* * * * *